May 7, 1957 T. J. KAUFFELD 2,791,271
PULSE JET HEATING BURNER CONTROL SYSTEM
Filed Aug. 23, 1954 2 Sheets-Sheet 1

INVENTOR.
THEODORE J. KAUFFELD
BY *Pennie, Edmonds, Morton, Barrows and Taylor*
ATTORNEYS

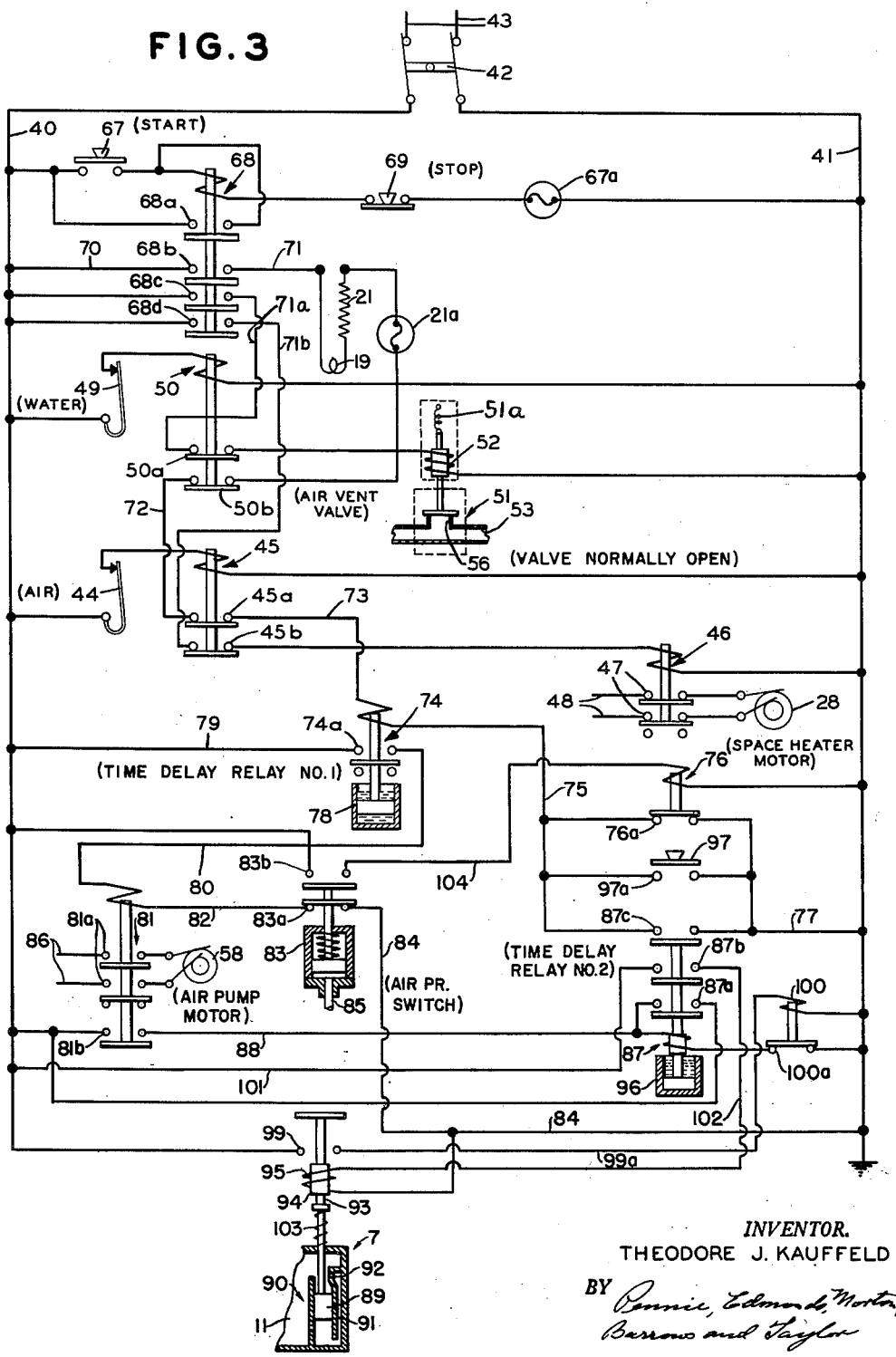

United States Patent Office 2,791,271
Patented May 7, 1957

2,791,271
PULSE JET HEATING BURNER CONTROL SYSTEM

Theodore John Kauffeld, Convent, N. J.

Application August 23, 1954, Serial No. 451,453

13 Claims. (Cl. 158—28)

This invention relates to starting and control systems for resonant pulse jet heat generators in which the resonant pulse jet burner thereof has a combustion chamber and a directly connected exhaust tube which together form a resonator that is excited at its acoustic frequency by detonations produced periodically in the combustion chamber.

When such heat generators are used for space heating, or the like, a suitable liquid medium, such as water, is brought into heat exchanging contact with the walls of the combustion chamber and exhaust tube, whereby heat is removed and utilized by circulating such liquid through a heat exchanger by means of which the heat from the liquid is transferred to the atmosphere of the space to be heated.

The present invention relates particularly to a simple, reliable control system for automatically initiating combustion in the combustion chamber of the resonant pulse jet burner, and for automatically controlling the continued operation of the burner according to the demand for heat production.

In starting the resonant pulse jet burner, it is necessary to inject combustion air and fuel into the combustion tube of the burner in suitable amounts, the tube having previously been brought to the required operating temperature by means of a glow coil and heating device which are heated electrically.

The primary object of the invention is to provide a starting system which will automatically carry the resonant pulse jet burner through the necessary cycle of operating steps to bring about the initiation of combustion in the combustion tube and chamber.

Another object of the invention is to provide a starting and control system by means of which the pulse jet heat generator will automatically be shut down in the event of failure of the electric power supply for the control system.

Also, a particular object of the invention is the provision of a control system whereby the resonant pulse jet heat generator is operated automatically to maintain the temperature of the liquid circulating between it and the heat exchanger, and also the temperature of the space to be heated, within the desired operating limits.

Other objects of the invention will appear from the following description of the automatic starting and control system of the invention taken in connection with the accompanying drawings.

In these drawings:

Fig. 3 is a diagram of electrical connections.

Figure 1:
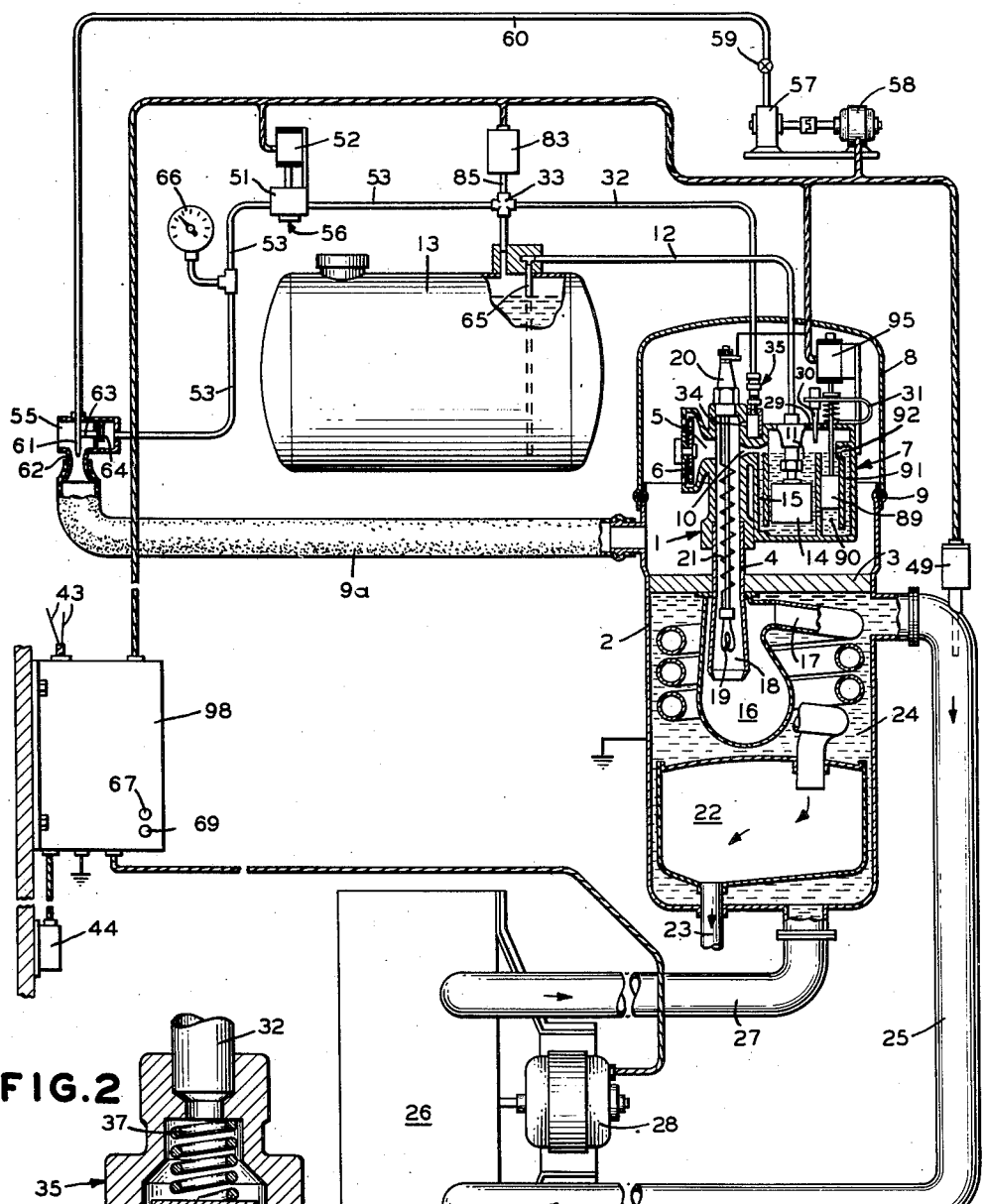
Fig. 1 is a view largely diagrammatic showing the resonant pulse jet heat generator and the heat exchanger together with the fuel tank and various parts of the starting and control system.

The resonant pulse jet burner is indicated generally by reference numeral 1 and is mounted within a casing 2, the upper part of which is separated from the lower by means of a bulkhead 3 which is welded, or otherwise secured to the casing walls, to make the lower section watertight. Burner 1 comprises a combustion tube 4, an air intake 5, in which is mounted a check valve 6, and a carburetor 7. These parts are located above bulkhead 3 and are accessible by removing the head or cover 8 which is mounted on the upper end of casing 2 by means of an air-tight joint 9. Combustion air is supplied to the interior of head 8 through a duct 9a. Once the burner is started this air is drawn in by suction produced by the operation of the burner. During starting the air is supplied artificially, as will be later described.

Fuel such as gasoline, or other low boiling hydrocarbon, is drawn into the interior of combustion tube 4 through a Venturi tube 10 which connects the interior of the fuel chamber 11 of the carburetor 7 with the combustion tube, opposite the air intake 5. Air for Venturi 10 is drawn in through an aperture 29 in the top of the carburetor. Fuel is conducted to the carburetor 7 through a pipe 12 from a fuel tank 13, a pressure slightly above atmospheric being maintained within this tank to cause the fuel to flow, as will also be later described. The level of the fuel is maintained substantially at the level of the Venturi 10, as indicated, by means of a conventional valve actuated by a float 14. Fuel is fed into the Venturi 10 from the bottom of chamber 11 through a vertical passage 15.

During each suction phase of operation, combustion air (through duct 9a to casing head 8 and check valve 6), and a mixture of fuel and air (from carburetor 7 through Venturi 10), are drawn into the combustion tube 4. The air to form such mixture enters the carburetor through the aperture 29. Combustion tube 4 opens at its lower end into a combustion chamber 16 having an exhaust tube 17 connected thereto. Combustion tube 4 has an enlarged lower end 18 in which is arranged the glow coil 19 of an ignition plug 20. In the circuit of the glow coil 19 there is a heating coil 21, and these two devices are heated electrically for starting the burner, as will be more fully described later on.

Before describing the starting and control system of the invention, the operation of the heat generator, after it has been started, will be considered. Assuming that the resonant pulse jet burner is operating, after each detonation of fuel, there is a momentary rise in pressure within the burner tube which momentarily causes valve 6 to close against an apertured plate, such pressure causing a rapid flow of gas through the exhaust tube 17 in such volume as to induce a vacuum in the combustion chamber 16. This momentary vacuum draws in a fresh charge of combustion air and fuel mixture through the check valve 6 and Venturi 10 to support the next detonation.

The acoustic oscillation comprises detonation phases following each other at a frequency determined by the natural period of the combustion chamber 16 and its connected exhaust spaces including the exhaust tube 17, the expansion chamber 22 and the exhaust outlet pipe 23. These chambers may, for example, be so proportioned that the pulsing combustion takes place at a frequency of about 80 pulsations per second.

It will be understood that the periodic detonations keep the glow coil 19 incandescent and heat the combustion tube 4 and chamber 16 and exhaust connections 17 and 22. This heat is absorbed by the liquid medium, such as the water 24 in the lower part of casing 2, which surrounds the exhaust system just mentioned. This liquid is thermally circulated through an outgoing pipe 25 to a heat exchanger 26, from which it is returned to the bottom of casing 2 by a pipe 27. Heat exchanger 26 is of a conventional type including an air circulating fan driven by an electric motor 28. It will be understood that the atmospheric air within the space to be heated is thereby circulated through the exchanger.

It was stated above that during each suction phase, which follows each detonation phase, a mixture of fuel and air is drawn in from the interior of head 8 through aperture 29 in the carburetor and venturi 10 into combustion tube 4. In order to automatically regulate the ratio of the fuel and air mixture in combustion tube 4 according to changes in the ambient temperature, a conical valve member 30 is mounted on a bimetallic thermostatic element 31. Accordingly, the area of the aperture 29 is automatically varied in accordance with changes in atmospheric temperature. This is helpful in starting, particularly with extremely low ambient temperatures.

After the device is once in operation, the pressure in the upper portion of fuel tank 13 is maintained by means of pressure which is communicated to tank 13 through a tube 32 and a T connection 33, the opposite end of tube 32 being connected to the pulse jet burner 1 and the interior of burner tube 4 by means of a passageway 34. Connected in tube 32 at the top of the burner casting is a restricter device 35, illustrated in detail in Fig. 2.

This restricter device includes a flanged cap 36 which is biased by means of a coil spring 37, to close the opening at the upper end of a passageway 38 which leads to passage 34 in the casting of the burner 1. Flange 36 is provided with two small lateral holes 39 diagonally opposite one another, the purpose of the resticter being to permit comparatively free passage of pressure fluid in the upward direction but to restrict its passage in the opposite direction.

During the detonation phase of each pulsating combustion within burner tube 4, some of the gas within the upper end of the tube resulting from the combustion is caused to flow upwardly through passages 34 and 38 and into duct 32 raising the flanged cap 36. However, during the suction phase following each detonation, only a comparatively small amount of such gas is permitted to pass backwardly through the small holes 39. In this way the pressure above the fuel in tank 13 is maintained slightly above atmospheric pressure, and, at the same time, should the pulsing combustion in burner tube 4 cease for any reason, such, for example, as by water being inadvertently mixed with the fuel, the pressure within the fuel tank 13 will be bled off through the small holes 39 and into the manifold or burner tube 4, which is connected to atmosphere through the combustion chamber 16 and the exhaust passages.

This completes the description of the construction of the resonant pulse jet heat generator, its fuel tank and its connected space heater 26.

The mechanism embodying the automatic control system of the invention will now be described, together with its manner of operation.

The power for operating the control system is supplied from conductors 40 and 41 (Fig. 3) connected through a main switch 42 to line conductors 43 of, for example, a 110 volt 60 cycle circuit. An air thermostat 44, preferably of the bimetal type, is responsive to the temperature of the atmospheric air in the space to be heated, and its contacts may be set to close at any desired temperature, for example, 69° F. and to open at a suitable higher temperature, for example 72° F. The thermostat contacts close and open the circuit of the operating coil of an electromagnetically operated relay or solenoid switch 45 having two sets of contacts 45a and 45b.

When air thermostat 44 calls for heat, solenoid switch 45 is energized and, through its contacts 45b, completes a circuit from supply conductor 40 through the operating coil of another solenoid switch 46, closing its double contacts 47. This places in operation motor 28 of the space heater 26 which may be supplied with energy from conductors 48, connected to main switch 42, if desired. Space heater motor 28 will operate so long as the temperature within the space to be heated is less than the maximum setting of thermostat 44.

A second thermostat 49 is associated with the outgoing water pipe 25 from casing 2 of the pulse jet heat generator so as to be responsive to the temperature of the water supplied to space heater 26. The range of operation of this thermostat may be, for example, between 92 and 125° F. So long as the temperature of the water leaving the heater is below such maximum setting, the contacts of water thermostat 49 will be closed, establishing a circuit through the operating coil of a solenoid switch 50. This switch is provided with two sets of contacts normally open 50a and 50b, both of which are closed when the operating coil is energized.

The mechanism for controlling, i. e. to turn on and cut off fuel supply to the resonant pulse jet burner 1, includes devices for pressurizing the fuel tank 13. It will be remembered that once the pulse jet burner 1 is in operation the pressure within tank 13 is maintained automatically by the burner, through tube 32. In order to release the pressure and stop the operation of the burner, a solenoid vent valve 51 having an operating coil 52 is arranged to vent the air pressure from the tank. It is connected in a line 53 which leads from T connection 33, and the interior of tank 13, to the burner air inlet manifold 55.

Figure 2:
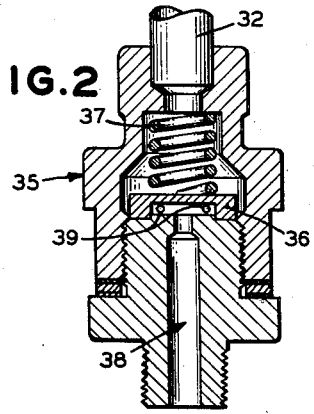
Fig. 2 is a vertical sectional view of a detail of the resonant pulse jet burner.

The construction of vent valve 51 is such that when the operating coil 52 is not energized the valve member moves by a spring 51a, or otherwise, to its open position, and line 53 is vented to atmosphere through an outlet 56 shown on the upper side of the valve in Fig. 3 and in the bottom of the valve, in Fig. 2. When operating coil 52 is energized, this valve member is actuated to its closed position and line 53 is no longer vented to atmosphere. Hence, fluid pressure can be built up within tank 13 and fuel thus turned on or supplied to the carburetor 7 of the burner. With this arrangement, should the power supply fail, the fuel tank will be automatically vented and stop the burner operation.

In order to supply fluid pressure to the tank 13 for the purpose of starting the burner, an air pump 57 driven by a motor 58 is provided. This pump is connected through a check valve 59 and pipe 60 to air manifold 55. Within this manifold pipe 60 branches and supplies air through a jet 61 to a Venturi tube 62 and also, through a cross tube 63 and a check valve 64, to line 53. The air flowing through cross tube 63 and line 53 will, if the operating coil 52 of vent valve 51 is energized, create pressure in the fuel tank, causing fuel to flow through discharge tube 65 of the tank and connecting tube 12 into the carburetor 7.

The air through jet 61 will induce the flow of air into manifold 55 through its open left end and force it through conduit 9a into the head 8 of casing 2 to supply the burner 1 of the pulse jet heater. At starting, this air passes through valve 6, burner tube 4, combustion chamber 16 and the exhaust passages. This provides fresh clean air to be mixed with the priming fuel injected into burner tube 4 by the priming device to be later described and thereby to form a combustible mixture to start the burner. The air flow through the burner tube and exhaust passages also scavenges the burner of partially burned products of combustion which may remain from the previous operation. An air pressure gage 66 may be provided in pipe 53 to indicate the pressure in fuel tank 13.

The operation of the control system of the invention will now be described; also the circuitry and certain additional elements of the system.

In order to start the resonant pulse jet burner 1, a push button starting switch 67 is momentarily closed. This causes current to flow from supply wire 40 through the operating coil of solenoid switch 68, thence through the contacts of a push button stopping switch 69 (normally closed), through glow lamp 67a and to the return conductor 41. This picks up the armature of solenoid switch 68, closing a pair of contacts 68a in a holding circuit to maintain the operating coil energized after the release of switch 67. The remaining contacts 68b, 68c and 68d are also closed at the same time. The purpose of glow lamp 67a is to give visual indication that the control system is in an operative condition even though the air and water thermostats 44 and 49 may not be calling for heat and the pulse jet burner consequently shut down.

Contacts 68b, 68c and 68d energize the three principal circuits of the system. These circuits comprise the glow plug circuit for heating glow plug 19, which circuit is energized from conductor 40 and wire 70 through contacts 68b, the vent valve circuit for controlling vent valve 51 which is energized from conductor 40 through contacts 68c, and the space heater circuit for controlling space heater motor 28, which is energized from conductor 40 through contact 68d. The remaining circuits of the system, namely, the air pump motor circuit for controlling air pump motor 58 and the priming device circuit for controlling the priming device 90, are controlled, directly or indirectly, by the glow plug circuit, as well appear later.

Assuming that both the air thermostat 44 and the water thermostat 49 are calling for heat, their contacts will be closed, as shown in Fig. 3, with the results as previously described, that is, picking up the respective solenoid switches 45 and 50 and thereby starting space heater motor 28 and closing vent valve 51. The energizing circuit for coil 52 of vent valve 51 is from contacts 68c of solenoid switch 68 through conductor 71a to contacts 50a of switch 50 and thence through coil 52 to return conductor 41.

The circuit for energizing the operating coil of solenoid switch 46 which controls the space heater motor 28 is from contacts 68d on solenoid switch 68 through conductor 71b to contacts 45b of switch 45, and thence to the coil of switch 46.

The glow plug circuit extends from supply conductor 40 through wire 70, contacts 68b of solenoid switch 68, and conductor 71 to glow coil 19 and its associated heater 21, thence through glow lamp 21a and to contacts 50b of the water thermostat controlled switch 50. These contacts being closed the circuit continues through conductor 72 to contacts 45a of air thermostat control switch 45. These contacts also being closed, the circuit continues through conductor 73 to the operating coil of a first time delay solenoid switch 74, and thence through conductor 75 to the normally closed contacts 76a of a solenoid switch 76 whose operating coil is normally de-energized, the glow plug circuit continuing from contacts 76a through conductor 77 to return conductor 41.

Hence, with all three of the solenoid switches 68, 50 and 45 energized, and their contacts closed, the glow plug circuit is completed, and the heating of glow plug 19 commences. Glow lamp 21a gives visual indication that glow plug 19 and heater 21 are in operation and is the means by which it can be determined whether or not the glow plug has burned out.

The purpose of time delay relay 74 is twofold. In the first place, after allowing the glow plug 19 to be heated long enough to warm up the burner tube 4 sufficiently for the combustion to start, relay 74 initiates the operation of air pump motor 58 so as to cause fuel to flow into the carburetor 7 and combustion air to be supplied to the burner through duct 9a. In the second place it indirectly causes the injection of igniting fuel into the burner tube through the mouth of Venturi 10 as will presently be described. These functions are brought about as follows:

Time delay relay 74 is set to close its contacts 74a about one minute after its operating coil is energized. For this purpose the relay is provided with a properly adjusted dashpot 78. Fig. 3 is intended to show that the movable contact member of the relay has just left its lowermost position. When it closes contacts 74a, the circuit will be completed from supply conductor 40 through conductors 79 and 80 to the operating coil of an air pump motor control switch 81, and thence through a conductor 82 to the lower contacts 83a of an air pressure operated switch 83, and thence through a conductor 84 to the return supply conductor 41. Air pressure switch 83 is connected by a tube 85 to T connection 33 (Fig. 1) and thus to the top of fuel tank 13.

When solenoid switch 81 picks up, its double contacts 81a will connect the air pump motor 58 with supply conductors 86, which may, if desired, be connected to main switch 42. The raising of the armature of solenoid switch 81 also will close lower contacts 81b and complete a circuit from supply conductor 40 and conductor 88 to the operating coil of a second time delay switch 87 and thence through contacts 100a of a relay 100 to return supply conductor 41.

One purpose of time delay switch 87 is to delay for a number of seconds after the starting of the air pump, the closing of its contacts 87b which control the injection of the priming fuel into Venturi 10. Thus by the time the priming fuel is injected, the air pressure in tank 13 will have raised sufficiently to cause fuel to flow through tube 12 into carburetor 7 of the burner, so that combustion will continue after it is initiated. For a reason which will appear presently, time delay switch 87 also has a set of normally open contacts 87c connected in the glow plug circuit in parallel with contacts 76a of relay 76 between conductors 75 and 77. When switch 87 operates it closes contacts 87c along with contacts 87a and 87b. Hence even if relay contacts 76a should be opened the glow plug circuit would remain closed through contacts 87c.

The injection of the priming fuel is brought about by the descent of a small solenoid operated pump plunger 89 which is arranged to reciprocate in the pump chamber of priming mechanism 90 which may be located at one side of carburetor 7. The descent of plunger 89 causes fuel to rise in a channel 91 and to stream through an orifice 92 at the top thereof across the top of the fuel chamber 11, through Venturi 10 and into the burner tube 4.

Pump plunger 89 is operated by a rod 93 carrying a solenoid core 94, and this core is pulled downwardly by the energization of operating coil 95 which occurs when the contacts 87b of time delay switch 87 are closed, this circuit extending from conductor 40 through wire 101, contacts 87b, wire 102, coil 95 and wire 84 to return conductor 41. The dashpot 96 of this switch may be set to cause the switch contacts to close in about forty seconds.

As the plunger of fuel priming device 90 completes its stroke it mechanically closes the contacts 99 of a limit switch which closes a circuit through wire 99a, through the operating coil of relay 100, and thence to return conductor 41. This picks up the armature of relay 100 opening its contacts 100a and thus opening the circuit of the operating coil of the second time delay switch 87. The opening of contacts 87b of this switch de-energizes coil 95 of the priming device 90 and allows a plunger 89 and its associated parts be returned to their normal upper position by means of a coil spring 103. The opening of contacts 87c opens the glow plug circuit.

By this arrangement the glow plug circuit is held closed and the heat current kept on glow plug 19 until after the priming plunger 89 has reached the bottom of its stroke. Contacts 87c of time delay switch 87 and contacts 76a of the relay 76 being connected in parallel in the glow plug circuit this circuit will be held closed until (a) time delay relay 87 is de-energized and opens its contacts as just described, or (b) the air pressure builds up in fuel tank 13 and operates air pressure switch 83, whichever requires the longer time. That is to say, the glow plug circuit remains closed through contacts 76a until, or unless, air pressure switch 83 has closed its contacts 83b which closes the circuit from conductor 40 through conductor 104 to the operating coil of relay 76 and thence to return conductor 41, thereby picking up the armature of this relay and opening contacts 76a in the glow plug circuit.

The contacts 97a of a push button switch 97 are also arranged in parallel with contacts 76a and contacts 87c in the glow plug circuit. Under unusually low ambient temperature conditions the time delay afforded by delay switch 74 may be insufficient to allow adequate heating of the burner tube by the glow plug 19 and its heater 21. In that event, push button switch 97 may be manually held closed for a longer time in order to bring the burner tube to operating temperature.

The initial combustion, or detonation, will take place as soon as the priming fuel is injected through Venturi 10 into the hot burner tube 4 which has been heated by the glow coil 19 and its associated heating coil 21. As previously described, the initial detonation of the fuel and air mixture in the tube 4 will cause a downward flow in this tube into the combustion chamber 16. This will be followed by a reduction in pressure in the burner tube which will draw in air and fuel through the check valve 6 and Venturi 10 respectively, and the detonations will be repeated at a frequency of about 80 per second so long as fuel continues to be fed to the carburetor 7.

The fuel pressure in the top of fluid tank 13 builds up first under the operation of air pump 57 and, as soon as the pulsating combustion commences, is continued by the pressure pulsations through tube 32, as previously described. As soon as the tank pressure reaches the desired value, which is only slightly above atmospheric pressure, pressure operated switch 83 raises its movable contact member, first opening the circuit of contacts 83a and then closing another circuit through contacts 83b. The opening of contacts 83a will de-energize the operating coil of solenoid switch 81 and shunt down the air pump motor 58. The closing of contacts 83b energizes the coil of relay 76 thus opening the circuit of glow plug 19 as previously described. Preheating of the glow plug is no longer necessary. The reopening of contacts 81b of air pump switch 81 conditions the coil circuit of time delay switch 87 for the next starting operation, one of the effects being to allow the plunger 89 of priming device 90 to return to its original position at the top of its cylinder.

When the temperature of the water being circulated through the space heater 26 reaches the maximum setting of water thermostat 49, its contacts will open thereby deenergizing the operating coil of switch 50 and causing its movable member to drop. This opens the contacts 50a and de-energizes operating coil 52 of air vent valve 51 thus allowing spring 51a to raise the movable member of this valve and vent fuel tank 13 to atmosphere through outlet 56, which in turn shuts down the pulse jet burner 1. It also opens contacts 50b in the glow plug circuit so the burner cannot be restarted unless the water thermostat 49 has again closed its contacts.

When the temperature of the circulating water has fallen to the predetermined lower limit, the contacts of water thermostat 49 will reclose, thereby re-energizing the operating coil of solenoid switch 50. The operation of this switch de-energizes coil 52 of the air vent valve, reclosing this valve. It also recloses the glow plug circuit, by closing contacts 50b, thereby again initiating the starting cycle of pluse jet burner 1 so as to cause it again to supply heat to space heater 26 through the circulating water.

When the temperature in the space to be heated rises to the maximum desired limit, the contacts of air thermostat 44 open, thereby de-energizing the operating coil of solenoid switch 45 and opening its contacts 45a and 45b. Thus, the space heater motor 28 is shut down, and the glow plug circuit for heating glow plug 19 is opened, so that, even if the water thermostat 49 should again call for heat, the starting cycle would not be again initiated until the temperature in the space to be heated has caused the contacts of the air thermostat 44 to reclose. It will be understood that the air space thermostat 44 does not directly shut down the pulse jet heat generator, but that this occurs only after the water in the circulating system has risen in temperature. Hence, the heat generator will be ready for prompt delivery of heat upon the next closing of the air thermostat contacts 44.

It will be understood that the operation of the pulse jet heat generator can be stopped at any time by manually depressing the stopping button switch 69. This opens the circuit of the operating coil of solenoid switch 68, causing its armature to drop and thereby opening contacts 68c and de-energizing the operating coil 52 of the fuel tank air vent valve 51. This vents the fuel tank to atmosphere so as to cut off the supply of fuel to the burner.

The solenoid switches 45, 50 and 68, and the time delay switches 74 and 87 as well as the two starting motor switches 46 and 81 are mounted preferably within a suitable box or housing as indicated, for example, at 98 in Fig. 1. The start and stop buttons 67 and 69 are shown as mounted on the front side of this box. The wiring shown in Fig. 3 connecting these various switches and the other parts of the control mechanism are arranged conveniently in cables as indicated in Fig. 1.

It will be understood that the scope of the invention is set forth in the appended claims and that changes may be made in the control system which are within the meaning of these claims without departing from the invention.

I claim:

1. In a heating apparatus including a pulse jet burner having an electrical preheating device for heating said burner at starting, means for supplying fuel to said burner and mechanism for controlling said fuel supply, an electrical control system for said burner comprising a circuit for connecting said preheating device to a power source, a time delay device responsive to current in said circuit, a priming device for injecting priming fuel into said burner, means controlled by said time delay device to actuate said fuel supply controlling mechanism to cause fuel to flow to said burner, and means controlled by said fuel supply controlling mechanism for actuating said priming device to start the burner.

2. In a heating apparatus including a pulse jet burner having an electrical preheating device for heating said burner at starting, an electrical control system for said burner comprising a circuit for connecting said preheating device to a power source, a time delay device having an operating coil, said coil being included in said circuit, a priming device for injecting priming fuel into said burner, a fuel tank connected to supply fuel to said burner, means for pressurizing said tank to cause fuel to flow to said burner, means controlled by said time delay device for actuating said pressurizing means, and a second time delay device controlled by said pressurizing means to cause actuation of said priming device after pressure is applied to said tank and after the preheating device is actuated for a predetermined time.

3. In a heating apparatus including a pulse jet burner, an electrical preheating device for heating said burner at starting, means for supplying fuel to said burner, and mechanism for controlling said fuel supply, an electrical control system for said burner comprising a circuit for connecting said preheating device to a power source, a time delay device having its operating coil in said circuit, means operated by said device for actuating said fuel control mechanism to supply fuel to said burner, means actuated by the fuel control mechanism to open the circuit of said preheating device, a circuit including an electrically operated priming device for injecting priming fuel into said burner, and switch means actuated by said fuel controlling mechanism for conditioning said priming device circuit for the operation of said device.

4. Heating apparatus as claimed in claim 3 wherein a device is provided in the priming device circuit for delaying the operating of the priming device after the operation of the fuel controlling mechanism to supply fuel to the burner.

5. In a heating apparatus, a pulse jet burner including an electrical preheating device for heating the burner at starting, a circuit for connecting said preheating device to a power source, a fuel tank connected with said burner, and burner starting mechanism comprising means for pressurizing said tank to force fuel therefrom to the burner, a vent valve for venting the tank to atmosphere to shut off the supply of fuel, switch means for closing said preheating device circuit to start the burner, electrical means actuated by said circuit closing means for closing said vent valve, a time delay device responsive to current in said preheating device circuit, electrical means controlled by said device for causing actuation of said pressurizing means to apply fluid pressure to the fuel tank and supply fuel to the burner, a pressure operated switch responsive to the pressure in said tank, and electrical means controlled by said pressure switch for opening the preheating device circuit when the tank pressure reaches a predetermined amount.

6. Apparatus as claimed in claim 5 wherein a motor driven air pump is employed as the means for pressurizing the fuel tank, and in which electrical means controlled by the pressure-operated switch opens the circuit of the air pump motor when the tank pressure reaches a predetermined amount.

7. A pulse jet burner starting mechanism as claimed in claim 5 in which a priming device is arranged to inject starting fuel into the pulse jet burner, and wherein electrical means is controlled by the time delay device to actuate the priming device to cause injection of starting fuel after the operation of the preheating device for a predetermined time.

8. Heating apparatus as claimed in claim 5 wherein the air vent valve is biased to venting position so that the opening of the circuit of said electrical means for closing said vent valve due to power failure will release the pressure in the fuel tank and shut down the burner.

9. In a heating apparatus, a pulse jet heat generator including a pulse jet burner and exhaust system, a casing enclosing said heat generator, a heat exchanger having a motor driven fan for circulating air therethrough and warming the space to be heated, a liquid circulating system interconnecting said casing and the heat exchanger, a thermostat responsive to the temperature of the air in the space to be heated, and a thermostat responsive to the temperature of the liquid in said circulating system, the combination of a control system for said heating apparatus comprising an electrical preheating device for heating the burner at starting, a circuit for connecting said preheating device to a power source, a fuel tank connected with said burner, a motor driven air pump connected to apply air pressure to said tank to force fuel therefrom to the burner, a solenoid operated vent valve connected to vent the tank to atmosphere to shut off the supply of fuel, means for closing said preheating device circuit to start the burner, means actuated by said circuit closing means for closing said vent valve, a time delay device responsive to current in said preheating device circuit, means controlled by said time delay device for causing actuation of said air pump motor to apply fluid pressure to the fuel tank and suppy fuel to the burner, a pressure operated switch connected to said tank, electrically energizable means controlled by said pressure switch for stopping the air pump motor and for opening the preheating device circuit when the tank pressure reaches a predetermined amount, a fuel priming device for said burner, means controlled by the time delay device to actuate said priming device, a solenoid operated switch controlled by the liquid temperature responsive thermostat and having contacts connected to the solenoid of said vent valve to cause the opening of said valve to stop the operation of said burner when the temperature of the circulating liquid reaches a predetermined amount, a solenoid operated switch controlled by the air temperature responsive thermostat and having contacts connected to control the heat exchanger fan motor, and contacts on said last named switch for closing the preheating device circuit to permit restarting of said burner.

10. Heating apparatus as claimed in claim 9 in which the solenoid operated switch controlled by the liquid temperature responsive thermostat has contacts connected in the preheating device circuit which are closed when this thermostat calls for heat, thereby restarting said burner.

11. In a heating apparatus including a pulse jet burner having an electrical preheating device for heating said burner at starting, an electrical control system for said burner comprising a circuit for connecting said preheating device to a power source, a time delay device having an operating coil, said coil being included in said circuit, a priming device for injecting priming fuel into said burner, a fuel tank connected to supply fuel to said burner, means for pressurizing said tank to cause fuel to flow to said burner, electrical means controlled by said time delay device for actuating said pressurizing means, and electrical means controlled by said pressurizing means for actuating said priming device whereby the preheating device is heated for a predetermined time before the priming device is actuated to start the burner.

12. In a heating apparatus, a pulse jet burner including an electrical preheating device for heating the burner at starting, a circuit for connecting said preheating device to a power source, a fuel tank connected with said burner, and burner-starting mechanism comprising means for pressurizing said tank to force fuel therefrom to the burner, switch means for closing said preheating device circuit to start the burner, a time delay device responsive to current in said preheating device circuit, electrical means controlled by said device for causing actuation of said pressurizing means to apply fluid pressure to the fuel tank and supply fuel to the burner, a pressure-operated switch responsive to the pressure in said tank, electrical means controlled by said pressure switch for opening the preheating device circuit when the tank pressure reaches a predetermined amount, a priming device having an electrical operating circuit, a second time delay device to control said priming device circuit, said time delay device having initial and operating positions and being moved to operating position to energize said priming device circuit under the control of said first named electrical means, and means for opening the preheating device circuit when said second time delay device returns to its initial position, whereby the preheating device circuit is maintained closed until the priming device has operated or the air pressure builds up in the fuel tank, whichever requires the longer time.

13. A heating apparatus as claimed in claim 12 wherein the second time delay device has an operating coil whose circuit is controlled by electrical means and in which a relay is provided having normally closed contacts connected in said operating coil circuit, there being circuit means including the operating coil of said relay energized by said priming device at the completion of the priming operation, the picking up of said relay thereby opening the operating circuit of the second time delay device and allowing it to return to its initial position.

References Cited in the file of this patent
UNITED STATES PATENTS

| | | |
|---|---|---|
| 1,287,915 | Doble | Dec. 17, 1918 |
| 1,535,240 | Morris | Apr. 28, 1925 |
| 2,074,168 | Danuser et al. | Mar. 16, 1937 |
| 2,279,546 | Ziegler | Apr. 14, 1942 |
| 2,397,986 | Senninger | Apr. 9, 1946 |
| 2,621,718 | Krautter et al. | Dec. 16, 1952 |
| 2,644,512 | Durr et al. | July 7, 1953 |
| 2,703,565 | Lustig | Mar. 8, 1955 |